Nov. 6, 1956 J. D. CONFELD 2,769,862

CONVERTIBLE INTEROFFICE TRUNK

Filed Feb. 6, 1953 8 Sheets-Sheet 1

INVENTOR
JAMES D. CONFELD
BY T. L. Bowes
ATTORNEY

Nov. 6, 1956 J. D. CONFELD 2,769,862

CONVERTIBLE INTEROFFICE TRUNK

Filed Feb. 6, 1953 8 Sheets-Sheet 2

INVENTOR
JAMES D. CONFELD
BY T. L. Bowes
ATTORNEY

INVENTOR
JAMES D. CONFELD
BY T. L. Bowes
ATTORNEY

CONVERTIBLE INTEROFFICE TRUNK

Filed Feb. 6, 1953 8 Sheets-Sheet 4

INVENTOR
JAMES D. CONFELD
BY
T. L. Bowes
ATTORNEY

Nov. 6, 1956 J. D. CONFELD 2,769,862

CONVERTIBLE INTEROFFICE TRUNK

Filed Feb. 6, 1953 8 Sheets-Sheet 5

INVENTOR
JAMES D. CONFELD
BY T. L. Bowes
ATTORNEY

INVENTOR
JAMES D. CONFELD
BY
T. L. Bowes
ATTORNEY

CONVERTIBLE INTEROFFICE TRUNK

Filed Feb. 6, 1953 8 Sheets-Sheet 7

INVENTOR
JAMES D. CONFELD
BY
T. L. Bowes
ATTORNEY

Nov. 6, 1956 J. D. CONFELD 2,769,862

CONVERTIBLE INTEROFFICE TRUNK

Filed Feb. 6, 1953 8 Sheets-Sheet 8

INVENTOR
JAMES D. CONFELD
BY
T. L. Bowes
ATTORNEY 2,769,862

CONVERTIBLE INTEROFFICE TRUNK

James D. Confeld, Rochester, N. Y., assignor, by mesne assignments, to General Dynamics Corporation, a corporation of Delaware Application February 6, 1953, Serial No. 335,445
10 Claims. (Cl. 179—18)

This invention relates to telecommunication systems and particularly to interoffice trunking facilities for handling diversified traffic.

The object of the invention is the provision of simple and economical means for automatically converting an interoffice trunk from one adapted for one type of service to one adapted for another type of service.

Another object of the invention is the provision of means responsive to the manner in which the trunk is used for controlling the conversion thereof from one type of circuit to another.

In a specific embodiment of the invention disclosed herein a two way trunk circuit is employed to carry both local and toll traffic between a sub office and a tandem office. The local traffic will include connections to and from local substations in the tandem office and to and from local substations in a distant office known as a toll center. On outgoing calls from a local subscriber in the sub office this two way trunk will respond to the number of trains of dial pulses transmitted to its terminal in the tandem office and in response to the count thereof will control the circuit of the trunk accordingly. If the call is to the toll board at the distant toll center then but a single train of pulses will be transmitted, for the incoming switch at the tandem office has direct access over a convertible trunk to the toll board at the distant toll center. In these circumstances the two way trunk will be adapted for toll service, that is the calling subscriber's line will be held under control of the toll operator as in CLR (completing line recording) working, the usual battery reversal toward the calling subscriber on the answer of the called subscriber will be eliminated, provision will be made for coin box tone to be transmitted to the toll operator and the trunk from the tandem office to the toll center will be marked for toll. When the trunk is used for service in the other direction, means in the two way trunk circuit at the tandem office will respond to the supervisory signals over the trunk from the toll board at the toll center and convert these into signals for controlling the ringing circuits in conventional manner, that is, the connector in the sub office will be marked for toll and the ringing will be withheld until this ringing circuit is triggered by the toll operator.

When more than one train of dial pulses is transmitted to the two way trunk circuit at the tandem office to direct a call to a local subscriber either at the tandem office or the toll center, then the trunk is automatically converted to local connection working.

A feature of the invention is a two way trunk circuit having means responsive to the number of trains of dial pulses transmitted therethrough for converting the trunk to various modes of working. By this arrangement conventional conversion signals from one end to the other of the trunk are eliminated, thus eliminating the complications of superimposed circuits such as the simplexed or composited circuits and substituting therefor a simple counting means depending only on the conventional signals used for the establishment of the connection. If, upon seizure, only a single train of dial pulses is transmitted over the trunk, then the trunk will operate as a completing line and recording trunk extending to a toll operator's position, but if more than one train of pulses is transmitted thereover the trunk will be converted to local working.

Another feature of the invention is a set of digit discriminating relays at each end of the trunk, operated in one manner by the transmission of one train of dial pulses through said trunk and operated in another manner by the transmission of more than one train of dial pulses therethrough. Operated in one manner these relays prepare the trunk for one type of service and operated in another manner they prepare the trunk for a different type of service.

In the specific embodiment of the invention disclosed herein, there is provided a dual set of digit discrimination relays, one set at each termination of the trunk, both sets independently operated but both responsive to the transmission of the same trains of pulses. The digit discrimination relays at the incoming end of the trunk open the circuit to the calling line reversing relay to prevent the reversal of the polarity of the current being fed to the calling line, thus disabling the means for automatically registering a call on the calling line message register, or collecting a coin deposited by a subscriber if the call is being made from a coin box line and placing this function under the control of the toll operator. At the same time a circuit is established for holding the trunk against release by the calling subscriber and also placing this function under control of the toll operator. Further, a coin tone connection is made so that upon the answer of the toll operator, if the call has been extended from a coin box line, a spurt of tone will be transmitted into the trunk, audible to both the calling subscriber and the toll operator.

At the distant end the concurrently operated digit discriminating relays will interconnect the HS lead from the incoming switch to this trunk line termination to provide HS supervision between the trunk and the toll operator's position.

Thus the trunk is converted to CLR operation, that is, a trunk used by a calling subscriber for reaching a toll or long distance operator, over which the operator may receive and record the details of the call, and over which the operator may complete the connection.

If the calling subscriber transmits more than one train of dial pulses, then the said different operation of the two sets of digit discrimination relays will convert the trunk to conventional dial to dial operation, that is, to a trunk over which a distant train of switches may be set, which will repeat back the line reversal on the answer of the called subscriber and which remains under control of the calling subscriber.

A feature of the invention may therefore be stated as a trunk line having a termination circuit at each end thereof, and having digit discriminating means in each said termination circuit for controlling and adapting said trunk to different types of service in accordance with the number of trains of dial pulses transmitted therethrough.

Another feature of the invention is a trunk line having a termination circuit at each end thereof, each said termination circuit having a digit discrimination circuit, said two circuits being responsive concurrently to the number of trains of dial pulses transmitted therethrough in one direction only. It will be noted that the digit discrimination relays are operated only when the trunk line is employed for establishing a connection toward a distant toll board and are not operated when the trunk is used for traffic either over the toll or FS terminals thereof in the other direction. On calls to a local subscriber the difference between a connection extended from a local subscriber and a connection extended from a toll board is established by HS supervisory signals which convert the trunk to HS supervisory working for toll calls and leave the trunk unconnected for conventional line reversal supervisory signals in the other direction.

A feature of the invention may therefore be stated as a two way convertible trunk line, convertible in one way responsive to the number of trains of dial pulses transmitted therethrough and convertible in the other way by conventional fourth wire supervisory signals.

Other features will appear hereinafter.

The drawings consist of eight sheets having eight figures, as follows.

Figure 1:
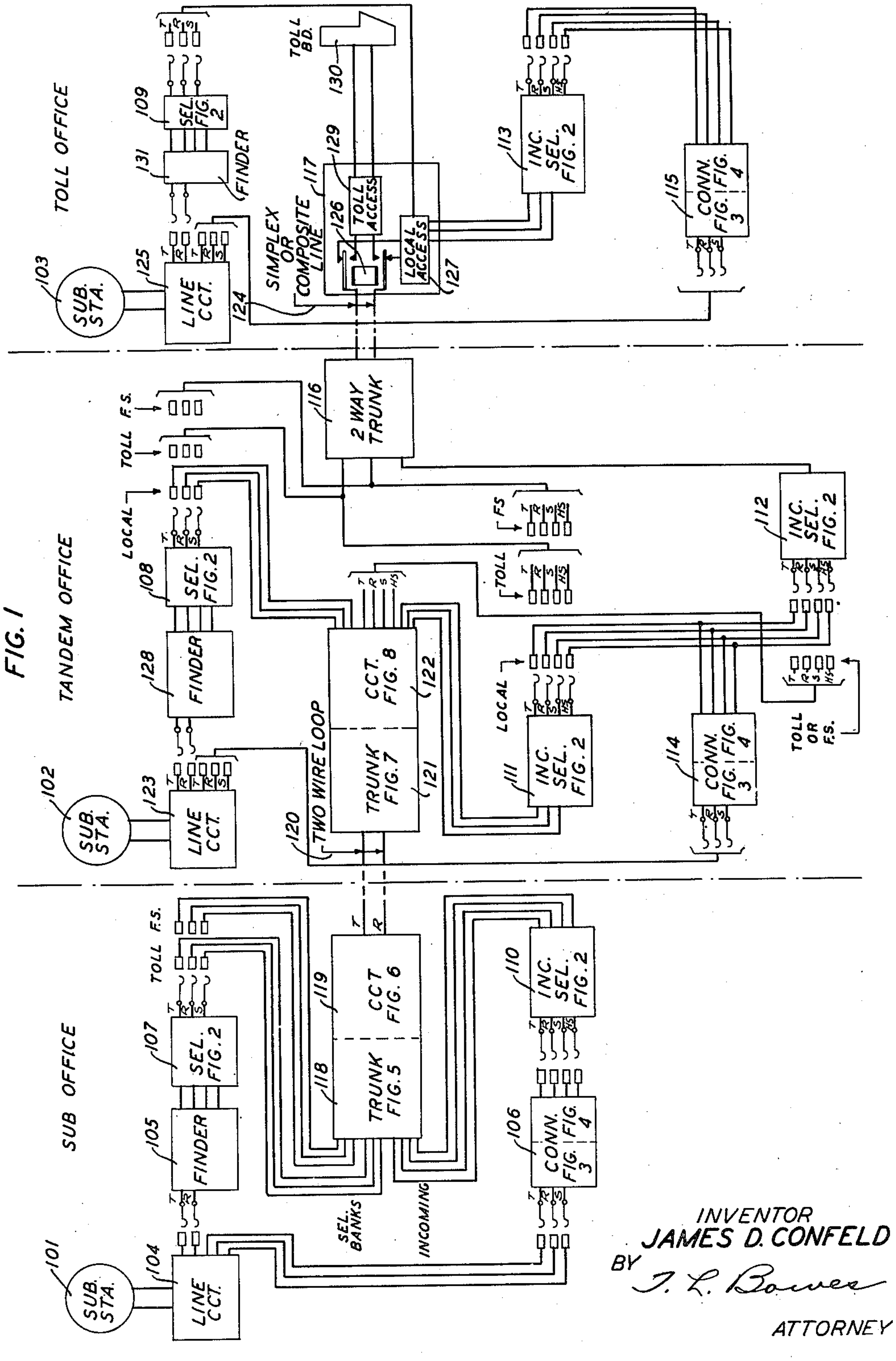
Fig. 1 is a schematic block diagram showing the organization of the telecommunication system in which the two way trunk of the present invention is employed.
Figure 3:
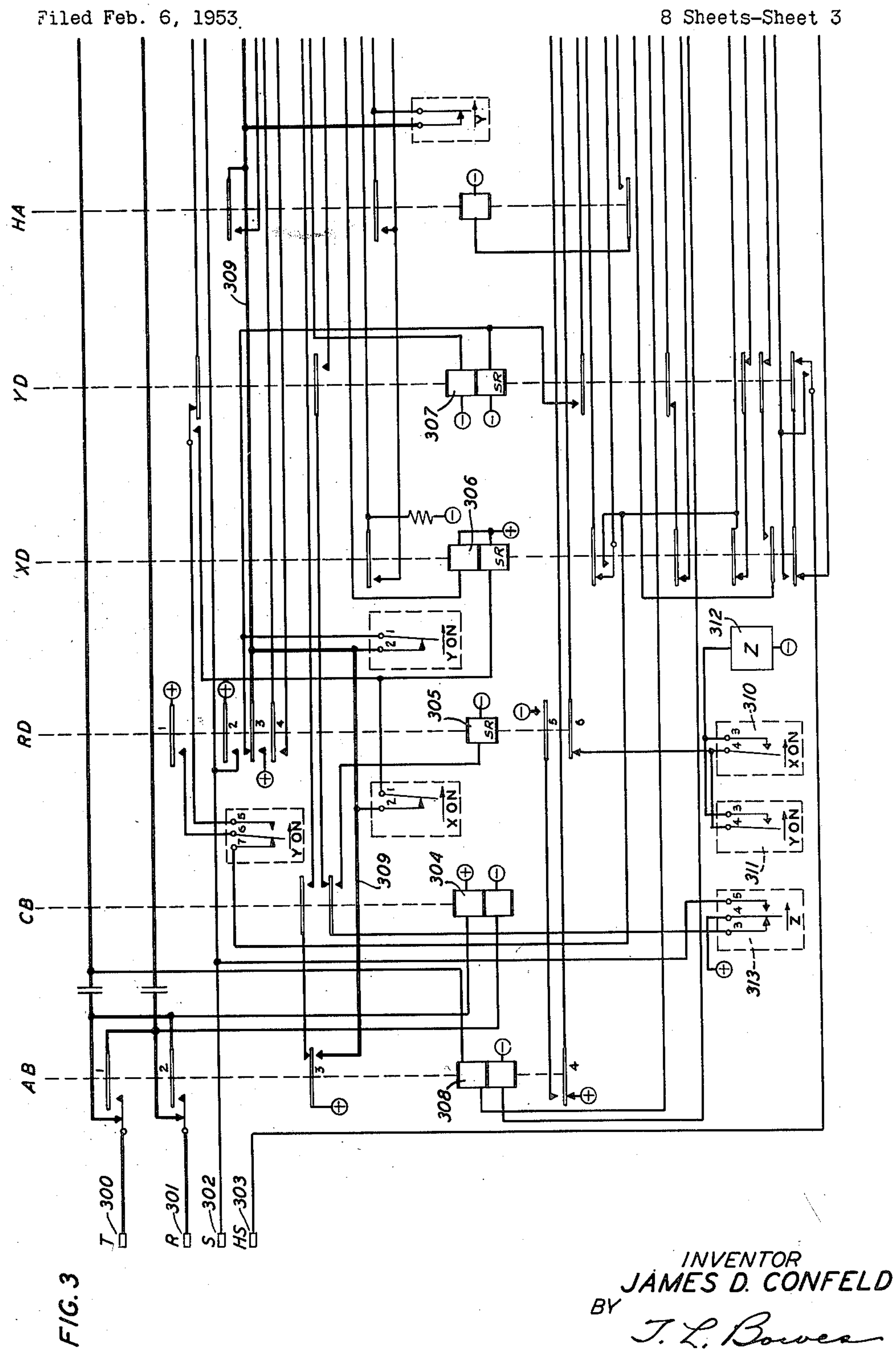
Figure 8:
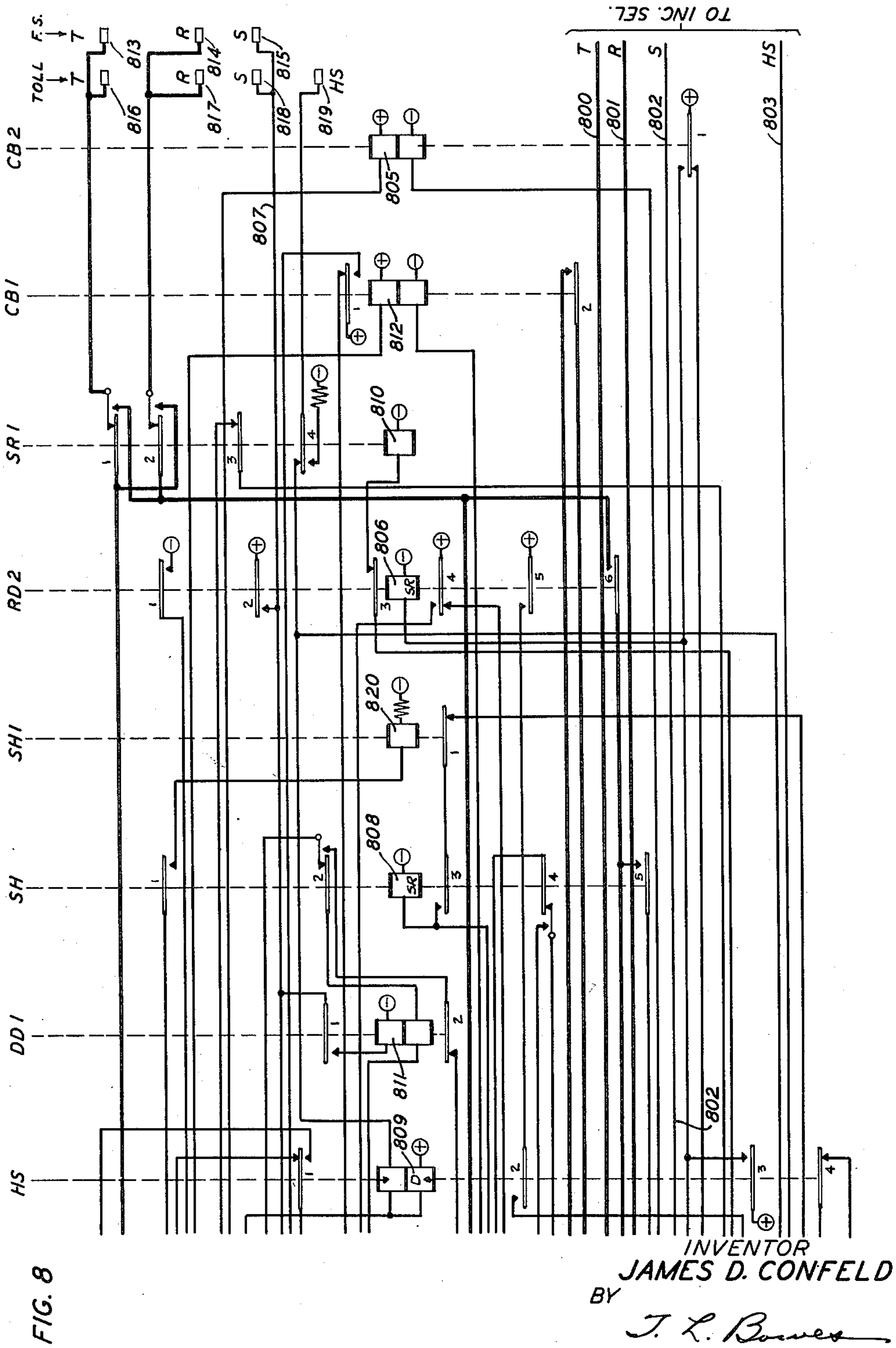
Figure 4:
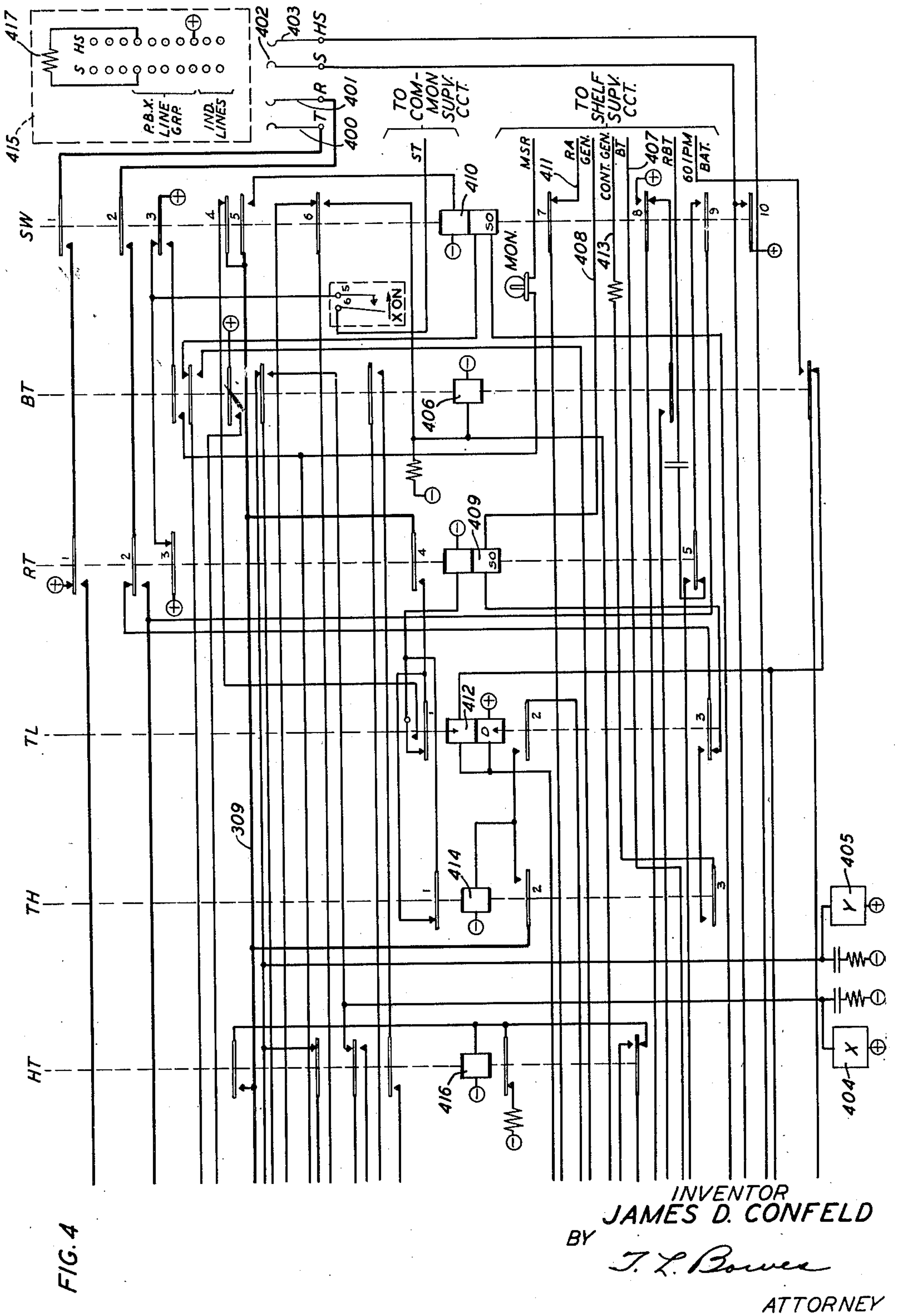
Figure 5:
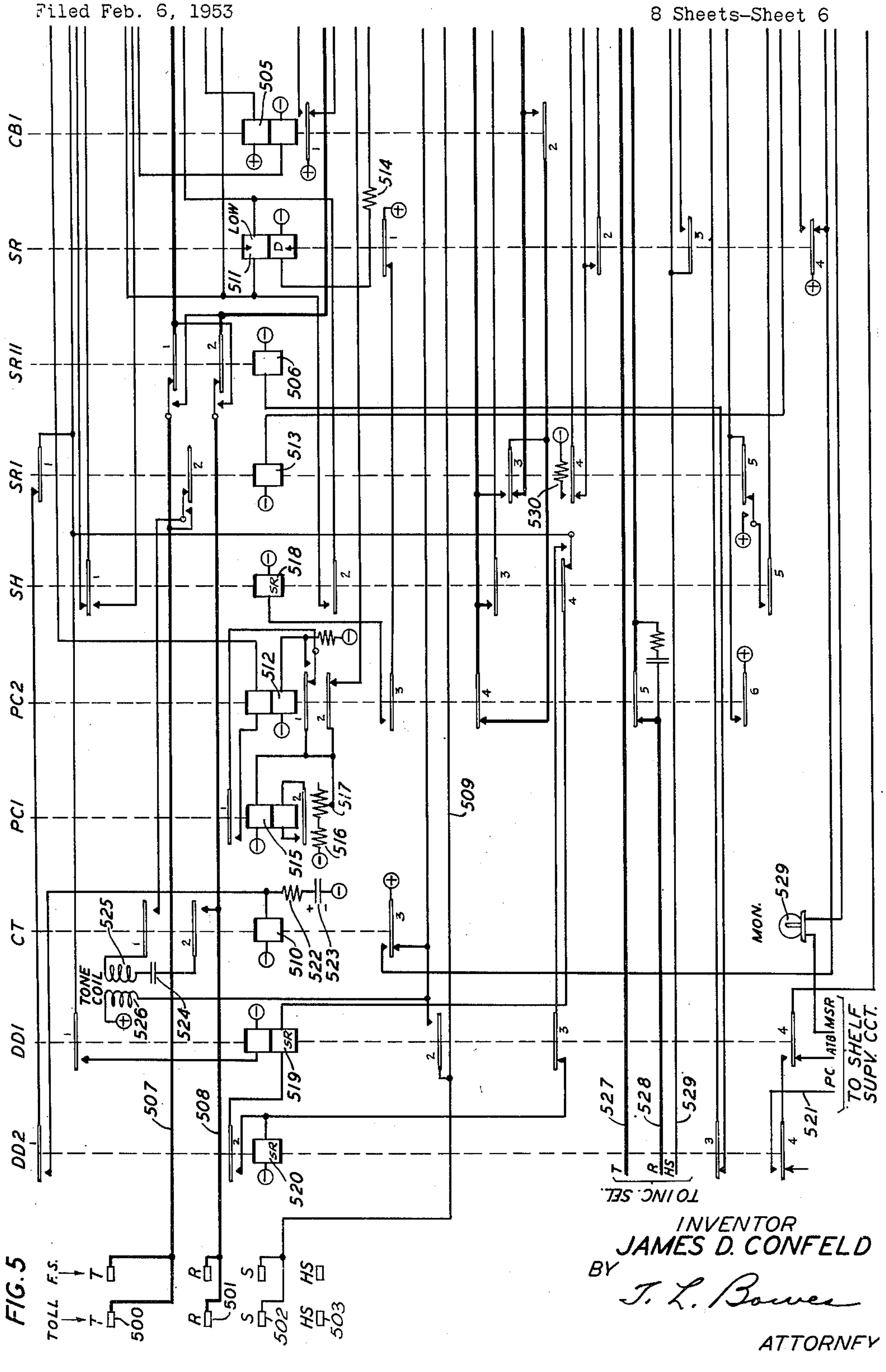
Figure 6:
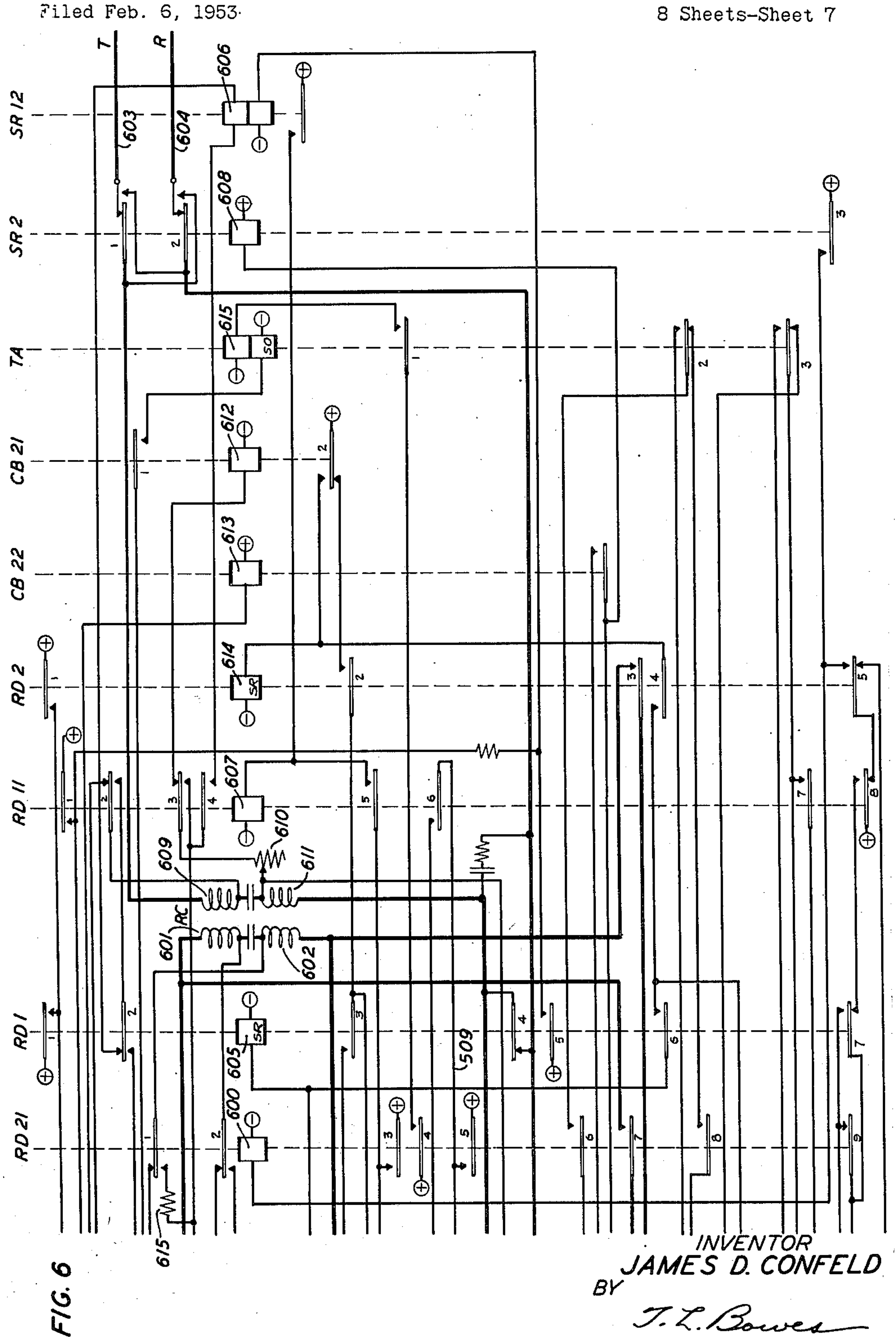
Figure 7:
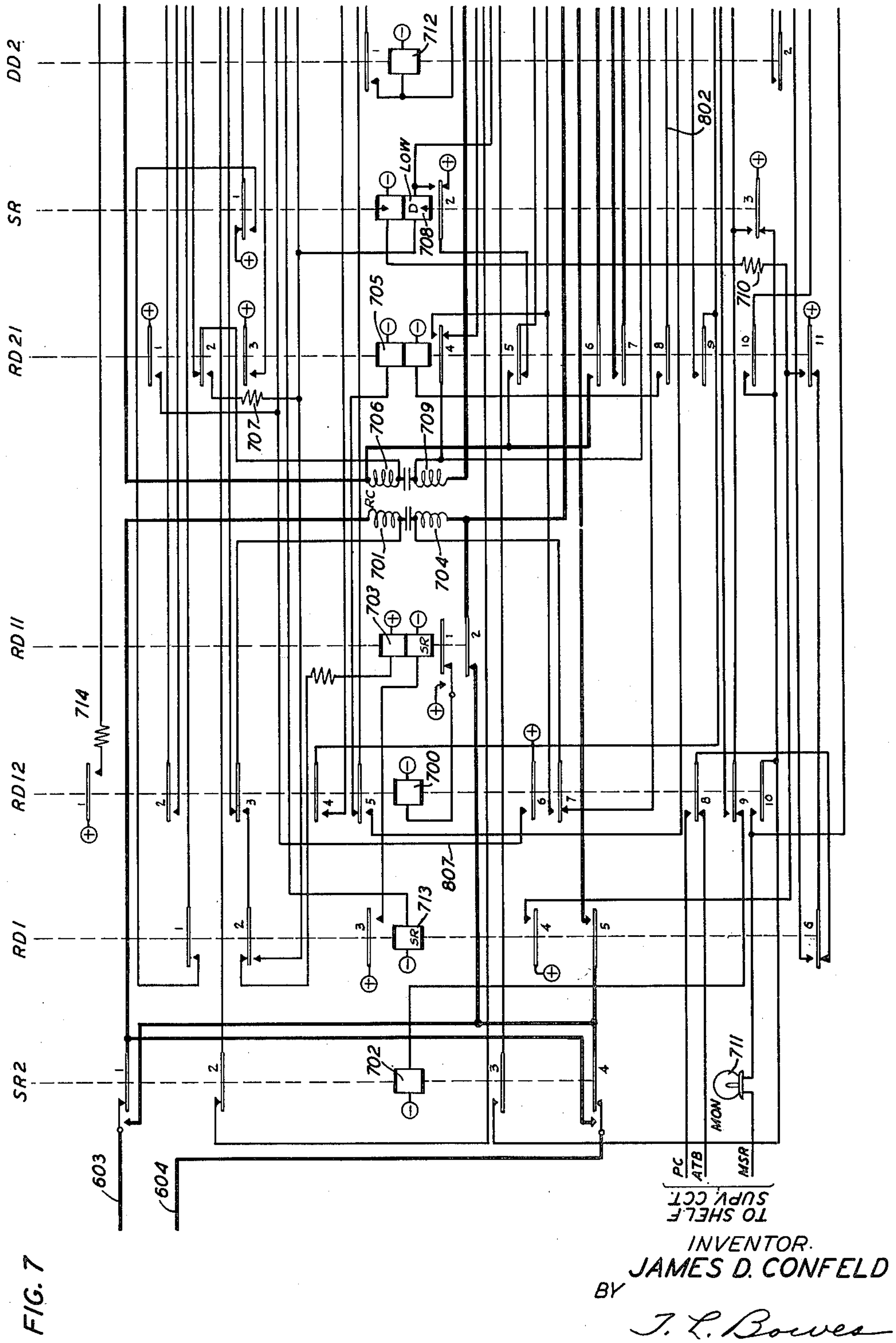

Figs. 3 and 4 taken together with Fig. 3 to the left of Fig. 4 disclose in circuit diagram a conventional connector;

Figs. 5 and 6 taken together with Fig. 5 to the left of Fig. 6 disclose the termination of the two way trunk of the present invention located at the sub office as indicated in Fig. 1; and Figs. 7 and 8 taken together with Fig. 7 to the left of Fig. 8 disclose the other termination of the two way trunk of the present invention used at the tandem office as indicated in Fig. 1.

Fig. 1 is a schematic diagram of the system in which the two way trunk circuit of the present invention is employed. This system involves three offices, first a sub office, second a tandem office, and third a toll office. There are local subscribers in each of these offices and each of said subscribers has access to each of the others in the same or in different offices as well as to the toll board in the toll office. The two way trunk circuit of the present invention is employed for traffic between the sub office and the tandem office or the sub office and the toll office and will automatically discriminate on calls from the sub office between those directed to the toll board and those directed to local subscribers either in the tandem office or the toll office and will, by this automatic discrimination, prepare the trunk for the particular type of traffic which it is to serve.

There is a two way trunk circuit serving to carry traffic between the tandem office and the toll office, which with respect to the present application is conventional, being disclosed in my copending application Serial Number 295,278, filed June 24, 1952, now Patent No. 2,748,193, which application is incorporated herewith by reference for a complete disclosure of the present system.

Figure 2:
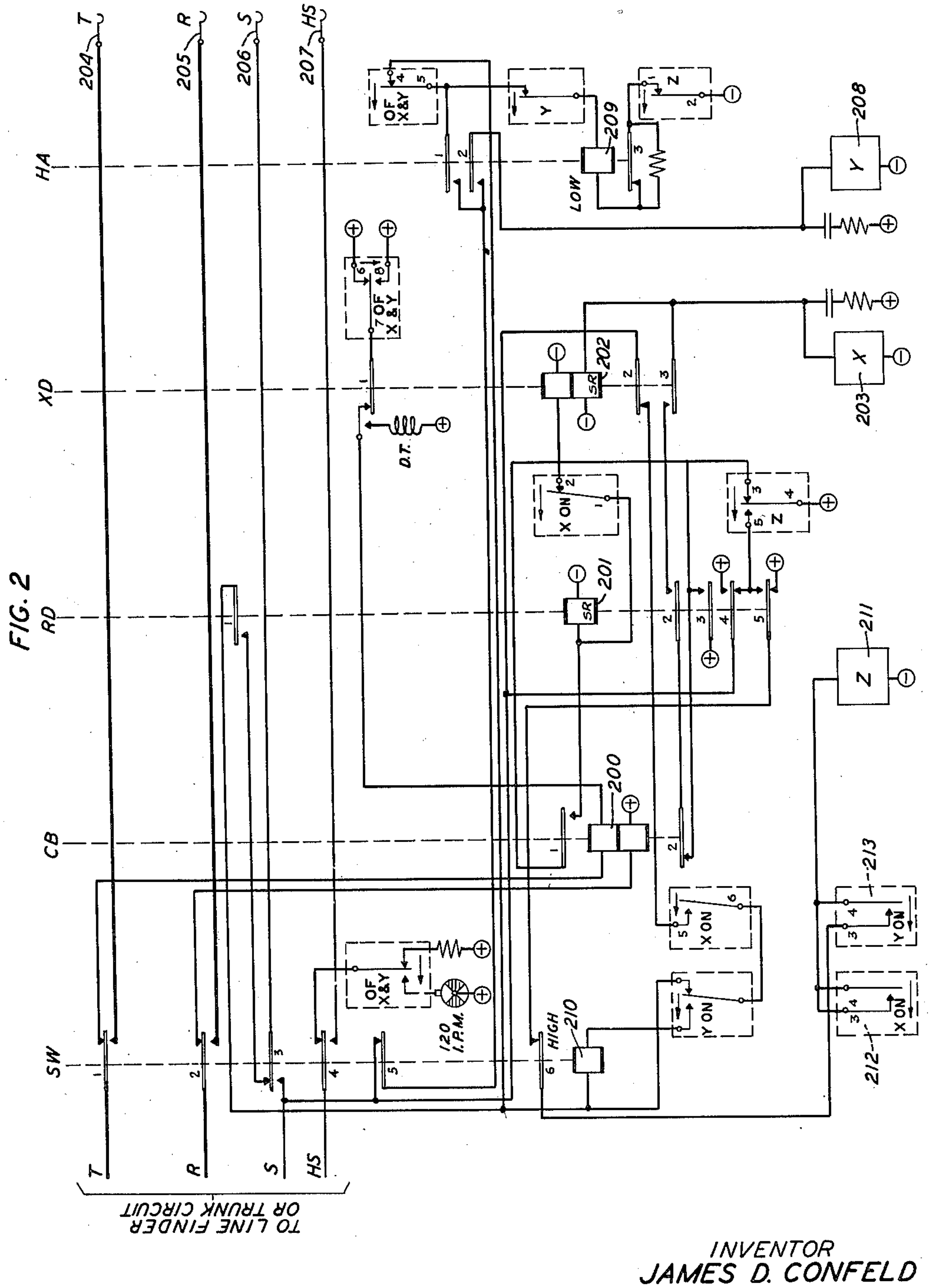
Fig. 2 is a circuit diagram of a conventional selector used as indicated in the block diagram Fig. 1.

The local substations are represented by the substation 101 in the sub office, the substation 102 in the tandem office and the substation 103 in the toll office. Each such substation is connected to a conventional line circuit, such as the line circuit 104, and each line circuit is provided with terminals whereby an outgoing call will be picked up by a conventional finder switch such as the finder 105 and whereby an incoming call may be extended thereto by a conventional connector such as the connector 106. A conventional selector, such as the selector 107, is used to extend outgoing calls, locally (connections to a connector not indicated) or to trunk circuits leading to distant offices. Generally, the selector may gain access to a two way trunk circuit over a plurality of sets of terminals (known as toll access and free service access) in accordance with the type of service desired (as marked by the digit dialed in making the call). The selector circuit employed is, with respect to the present application, conventional but for purposes of clarity is disclosed herein in Fig. 2 in detail. Such a selector is provided with four incoming terminals T, R, S and HS, the S and HS being differently employed in different types of service. Thus the selectors 107, 108 and 109 used as local selectors, and the selectors 110, 111, 112 and 113 used as incoming selectors are fundamentally the same as indicated by the use of Fig. 2 for the details thereof in each instance. The details of the use of the various incoming T, R, S and HS connections in each case will appear in the detailed description hereinafter.

The connector circuit employed is, with respect to the present application, conventional, but for purposes of clarity in the description, particularly with respect to its different operation in toll and local service, is disclosed in full herein as Figs. 3 and 4. Thus the connectors 106, 114 and 115 are each labeled Figs. 3 and 4.

The two way trunk circuit extending between the tandem office and the toll office is here designated as 116 (at the tandem office) and 117 (at the toll office) but it will be understood that the details of these circuits are to be found in my above noted copending application.

The two way trunk circuit extending between the sub office and the tandem office is shown in detail in Figs. 5 and 6 (at the sub office) and Figs. 7 and 8 (at the tandem office).

If a subscriber at substation 101 wishes to make a call to the subscriber at substation 102, a path will be built up through line circuit 104, finder 105, selector 107 set on its FS (free service) terminals, the two way trunk circuit 118 and 119 at the sub office, the two wire loop circuit 120, the two way trunk circuit 121 and 122 at the tandem office, the incoming selector 111, the connector 114, the line circuit 123 and the substation 102. The trunk circuit at the sub office and at the tandem office will respond to a plurality of trains of pulses used for setting the incoming selector 111 and the connector 114 and will automatically adjust its circuit for this local type service.

Likewise, when a local call is made from the substation 101 to the substation 103, the same facilities will be used up to and including the incoming selector 111 but thereafter will be extended as follows, over the free service terminals of the selector 111, the two way trunk circuit 116, the simplex (or composite) line 124, the two way trunk circuit 117, the incoming selector 113, the connector 115, the line circuit 125, to the substation 103. Since a plurality of trains of pulses to set the incoming selector 111, the incoming selector 113 and the connector 115 will be transmitted through the two way trunk circuit, this circuit will automatically respond thereto and adjust its circuit for this type of local service. Likewise, since the two way trunk circuit 116 is approached over its free service terminals, the call will be marked as local and the relay 126 in the distant two way trunk circuit 117 will be left undisturbed so that the local access circuit 127 will be effective.

In like manner, and as fully described in my above noted copending application, a subscriber at substation 102 may extend a connection to a subscriber in the distant toll office at the substation 103 over a path including the line circuit 123, the finder 128, the selector 108 set on its free service terminals, the two way trunk circuit 116, the simplex line circuit 124, the local access circuit 127, the incoming selector 113, the connector 115, the line circuit 125 to the substation 103.

Should the subscriber at substation 101 wish to make a toll or long distance connection he will, by dialing zero, extend a connection from his substation 101, the line circuit 104, the finder 105, the selector 107 set on the toll terminals thereof, the trunk circuit termination 118 and 119, the two wire loop circuit 120, the trunk circuit terminal 121 and 122, to the incoming selector 111. Should the subscriber then dial a second zero, the incoming selector 111 will be set on its toll terminals, the two way trunk circuit 116, the simplex line circuit 124, the toll access circuit 129 to the toll board 130. Since the two way trunk circuit between the sub office and the tandem office has been selected and thereafter another zero digit has been dialed to cause the incoming selector 111 to set its brushes on the toll access terminals to the two way trunk leading to the toll office and since thereafter no further digits are transmitted through the trunk circuit 121 and 122, this trunk circuit will respond and become converted for toll working. Furthermore, since the incoming selector 111 has been set on its toll terminals the two way trunk circuit between the tandem office and the toll office will be conditioned for toll service which means that the relay 126 will be operated so that the toll access circuit 129 will be effective rather than the local access circuit 127.

Regarding traffic in the other direction, it will be noted that if a subscriber at the toll office wishes to establish a connection to a local subscriber in the tandem office he will set up a connection from the substation 103, the line circuit 125, the finder 131, the selector 109, through the local access circuit 127 over the simplex line 124, the two way trunk 116, the incoming selector 112, the connector 114, the line circuit 123 to the substation 102. In case the subscriber at substation 103 wishes to get in touch with a local subscriber in the sub office, this same sort of connection will be established through the circuit described up to the incoming selector 112 thence over the free service terminals thereof through the trunk circuit 121 and 122, the two wire loop circuit 120, the trunk circuit termination 118 and 119, the incoming selector 110, the connector 106, the line circuit 104 to the substation 101. If a call is to be established from the toll board 130 to a subscriber in the tandem office, then a connection will be established from the toll board 130, the toll access circuit 129, the simplex line 124, the two way trunk circuit 116, the incoming selector 112, the connector 114, the line circuit 123, to the substation 102. The fact that the connection is established in one instance from a local substation 103 will cause the local access circuit 127 to be effective whereas in another instance the toll access circuit 129 will be made effective when the call comes from the toll board, as described in my above noted copending application.

Where a call is extended from the toll board to a subscriber in the sub office, then the connection will be established from the toll board 130 through the toll access circuit 129, the simplex circuit 124, the two way trunk circuit 116, the incoming selector 112, as described in my above noted copending application, thereafter over the toll terminals of the selector 112, the trunk circuit termination 121 and 122, the two wire loop circuit 120, to the trunk circuit termination 118 and 119 in the sub office, the incoming selector 110, the connector 106, the line circuit 104 to the substation 101. Since the approach to the trunk circuit termination in the tandem office has been over the terminals of the incoming selector 112, including the fourth wire (HS), the trunk circuit will be conditioned for toll service, and by means hereinafter described, the ringing in the connector 106 may be withheld and controlled by the operator at the toll board.

*The selector*

The selector shown in Fig. 2 is conventional. It may be used as a local selector where it forms part of a line finder and selector combination or as an incoming selector terminating a trunk circuit. It has a calling bridge CB relay 200 which may be seized and operated over the incoming T and R leads, a first slow RD relay 201, operated when the selector is seized and held operated until the selector cuts through for a clear metallic connection. A second slow relay XD relay 202 is operated when the selector is seized and holds until the end of the single train of dial pulses used for setting the selector has come to an end. There is an X magnet 203 used for driving the brushes 204, 205, 206 and 207 in their primary direction to select a given level and a Y magnet 208 for driving the brushes in the secondary direction to select an idle line in the selected level. An HA relay 209 of comparatively low resistance interacts with the Y magnet to drive the brushes automatically in the secondary direction and is placed in series with the SW cut through relay 210 of comparatively high resistance when an idle line is found, whereby the HA relay 209 fails to operate at this time but the SW relay 210 does operate. When the cut through relay 210 operates all other relays release and the SW relay is held operated by ground on the sleeve through the S brush 206. When finally the connection is to be released the ground is removed from the sleeve and a circuit is established for the Z release magnet 211.

In this circuit diagram the various X off-normal, Y off-normal and overflow contacts are separately shown in broken line rectangles placed for convenience in such locations that the circuit will appear as simple as possible. Thus, by way of example, the releasing circuit may be traced from ground, the back contact and armature 5 of the RD relay 201, the back contact and armature 6 of the SW relay 210, thence in parallel through the X off-normal contact shown in rectangle 212 and the Y off-normal contact shown in rectangle 213, the Z release magnet 211 to battery. When the brushes have been returned to normal both the X off-normal and the Y off-normal contacts return to the condition shown and the releasing circuit is opened. Other details of this circuit are not described as the selector is conventional.

*Connector*

The connector, shown in Figs. 3 and 4, is, with respect to the present disclosure, conventional. It is provided with four incoming terminals, T, R, S and HS and four brushes T, R, S and HS for outgoing connections. The connector is provided with a CB calling bridge relay 304 which responds to a bridge on the calling line over the incoming tip terminal 300 and the incoming ring terminal 301. The calling bridge relay 304 responds to incoming dial pulses to operate the X magnet 404 on the first train thereof to move the brushes 400 to 403 inclusive in the primary direction to select a level and to operate the Y magnet 405 on the second train thereof to move the brushes in the secondary direction to select a given set of outgoing terminals in the selected level.

Upon the seizure of the connector three slow release relays are energized, the RD first slow release relay 305 which holds thereafter until the calling bridge relay 304 is released, the XD second slow release relay 306 which holds until the first train of dial pulses has ended and the YD third slow release relay 307 which holds until the second train of dial pulses has ended.

When the connector is used in a local connection and the brushes have been set on the terminals of a called line a busy test is made. If the called line is busy, ground on the sleeve will cause the operation of the BT busy test relay 406 whereupon busy tone supplied over the BT busy tone lead 407 from the shelf supervisory circuit will be applied to the calling line. If the called line is free, then upon the release of the YD relay 304, ringing current from the generator lead 408 from the shelf supervisory circuit will be extended through the lower winding of the RT ringing trip relay 409 to the called line, the SW cut through relay 410 operating as soon as the called line is found to be idle. When the called party answer the RT relay 409 responds and cuts the connection through to the AB answer bridge relay 308.

This connector provides what is termed last party release, that is, the connector itself will be held until both parties to the connection have released. If the called party releases first, then the AB relay 308 will be released and by the movement of its armature 3 will remove one ground connection from the master ground wire 309. However, this master ground wire is maintained grounded by armature 3 of the RD relay 305, so that the SW cut through relay 410 cannot release until the calling party also releases. If the calling party releases first the release of the RD relay 305 removes ground from the incoming sleeve terminal 302 to release the preceding switches but the AB relay 308 still maintains a ground on the master ground wire 309 to prevent the release of the SW cut through relay 410.

In this connector circuit, like the selector circuit Fig. 2, the X off-normal, the Y off-normal, the overflow and the Y and Z magnet contacts are shown in broken line rectangles to clarify the circuit details. In like manner, and by way of example, the releasing circuit may be traced from ground supplied over the RA alarm lead 411 from the shelf supervisory circuit, the back contact and armature 7 of the SW relay 410, armature 6 and back contact of the RD relay 305 and thence in parallel through the X off-normal contacts shown in rectangle 310 and the Y off-normal contacts shown in rectangle 311 to the Z releasing magnet 312 to battery. Thus after both parties release and the master ground wire 309 is freed of ground, the SW relay 410 will release and close this releasing circuit whereby the brushes 400 to 403 inclusive will be returned to normal, whereupon the X off-normal and the Y off-normal contacts will be opened into the position shown in the rectangles 310 and 311. During the operation of the Z magnet 312 ground will be connected to the sleeve wire 302 by the Z contacts shown in rectangle 313 to prevent the seizure of the connector during this period.

If this connector is seized over a toll connection as fully explained in my above noted copending application, then the connector will be marked by battery applied to the HS lead 303 which will operate the TL relay 412 momentarily to operate and lock the RT relay 409. This will prevent the application of ringing current to the called line until the toll operator manipulates her ringing key. When this happens the result is another application of battery to the HS lead 303 and another operation of the TL relay 412. This in turn results in the unlocking of the RT relay 409 so that as soon as the TL relay 412 is restored the ringing current from the lead 408 through the lower winding of the RT relay 409 is applied to the called line. It may also be noted that after the called party has answered and caused the operation and locking of the RT relay that the operator may at will apply battery to the HS lead and operate the TL relay 412. Upon each such operation of this toll relay, ringing current from the continuous generator lead 413 from the shelf supervisory circuit will be extended through the armature 3 and front contact of the TH relay 414, front contact and armature 3 of the TL relay 412, the back contact and armature 2 of the RT relay 409 (now released by the operation of the TL relay 412) and thence to the called line. Thus current to re-ring the called subscriber may be applied to the called line at will and regardless of the value of the bridge on such called line.

In the upper right corner of Fig. 4, there is shown a broken line rectangle 415 having an indication of a row of terminals in cooperative relationship with the S brush 402 and the HS brush 403. A ground (indicated by (+), ground being connected to the positive terminal of the station battery) is shown connected to the third HS terminal which might be encountered by the HS brush and a resistance bridge between the seventh S terminal and the seventh HS terminal. This is an arrangement to provide for automatic idle line hunting in a P. B. X group. If the connector is dialed to the said third set of terminals then the ground on the HS lead will cause the operation of the HT hunting relay 416 so that the circuit will thereupon automatically function to drive the brushes successively over the lines of such P. B. X group until an idle line is found. If no idle line is found, the automatic line hunting operation will be stopped when the resistance bridge 417 is encountered.

Other details of circuit operation of this connector are not set forth herein as they are conventional and easily understood. It is believed that the foregoing description of the connector is sufficient for the purposes of the present disclosure.

*Two way trunk circuit*

The two way trunk circuit is shown on four sheets, Figs. 5 and 6 constituting the terminal at the sub office and Figs. 7 and 8 constituting the terminal at the tandem office. To explain the operation of this trunk a call from a local subscribed in the sub office to the toll board in the toll office will first be described. In order to establish such a connection the local subscriber dials "0" (for toll or long distance) whereupon the selector he has reached through his line circuit and line finder will set its brushes on the toll terminals of the trunk line (terminals 500, 501, 502 and 503) and the connection will be extended thereupon to the tandem office where the subscriber now gains control of the incoming switch connected to the T, R, S and HS conductors 800, 801, 802 and 803, respectively. The subscriber now again dials "0" to set this incoming switch on the toll terminals of the trunk extending from the tandem office to the toll office whereupon the connection will be extended to the toll board thereat. In the following description it will appear that since but a single train of dial pulses has been transmitted through the trunk line, the trunk will become adapted to toll working.

In conventional manner, as soon as the trunk of Figs. 5 and 6 is seized, a bridge is placed on the tip and ring conductors connected to the terminals 500 and 501 whereby the CB–1 calling bridge relay 505 is operated in a circuit traced from ground, the upper winding of the CB–1 relay 505, back contact and armature 2 of the RD–21 relay 600, upper left winding 601 of the repeating coil, armature 1 and back contact of the SR–11 relay 506, tip conductor 507, tip terminal 500, the calling bridge, ring terminal 501, ring conductor 508, back contact and armature 2 of the SR–11 relay 506, lower left winding of the repeating coil 602, armature 1 and back contact of the RD–21 relay 600 and the lower winding of the CB–1 relay 505 to battery indicated by the symbol (+). This latter relay in operating immediately operates certain slow releasing relays to ground the incoming sleeve conductor 509 and to establish a bridge on the outgoing trunk conductor 603 and 604. Through armature 1 of the CB–1 relay, a ground is extended over the front contact thereof to the winding of the first slow RD–1 relay 605 causing this relay to respond. The RD–1 slow releasing relay 605 now extends ground from its armature 5 and front contact through the lower winding of the SR–12 relay 606 to cause the operation of this relay and this relay in turn completes an operating circuit for the RD–11 relay 607. The RD–11 relay 607 grounds the incoming sleeve wire from ground, armature 3 and back contact of the CT relay 510, front contact and armature 6 of the RD–11 relay 607 to the sleeve wire 509.

The RD–11 relay 607 now closes a bridge which may be traced from the tip trunk conductor 603, back contact and armature 1 of the SR–2 relay 608, upper right winding 609 of the repeating coil, armature 2 and front contact of the RD–11 relay 607, armature 2 and front contact of the RD–1 relay 605, the upper low resistance winding of the SR relay 511, front contact and armature 3 of the RD–11 relay 607, adjustable resistance 610 (used to adjust the resistance value of this bridge) lower right winding 611 of the repeating coil, armature 4 and back contact of the PC–2 pulse correction relay 512, armature 2 and front contact of the CB–1 calling bridge relay 505, and in parallel therewith at this time, the armature 3 and back contact of the SR–1 relay 513, armature 2 and back contact of the SR–2 relay 608 to the ring trunk conductor 604. Another circuit for the SR relay 511 is closed from ground, the armature and front contact of the SR–12 relay 606, the front contact and armature 5 of the RD–11 relay 607, resistance 514 and the lower winding of the SR relay 511 to battery. However, the energization of this winding is opposed to the energization of the upper low resistance winding thereof so that the SR relay 511 does not operate at this time, but will respond at a later stage when the polarity of the current in the two wire trunk (conductors 603 and 604) is reversed.

The RD–11 relay 607 at its front contact and armature 4 partially prepares a circuit for the upper winding of the SR–12 relay for purposes which will appear hereinafter.

The result of the establishment of the bridge across the trunk conductors 603 and 604 will be, primarily, the energization of the CB–2 calling bridge relay 805 at the distant end. The circuit for this relay may be traced from ground, the upper winding of the CB–2 relay 805, back contact and armature 3 of the RD–12 relay 700, the upper left winding 701 of the repeating coil, armature 1 and back contact of the SR–2 relay 702, tip conductor 603 over the bridge described, ring conductor 604, back contact and armature 4 of the SR–2 relay 702, back contact and armature 2 of the RD–11 slow releasing relay 703, lower left winding 704 of the repeating coil, armature 7 and back contact of the RD–12 relay 700, the lower winding of the CB–2 relay 805 to battery. The CB–2 relay responds and brings up its slow releasing relays and places a bridge on the tip and ring conductors 800 and 801 leading to the associated incoming selector.

The operation of the CB–2 relay 805 extends ground from its armature 1 and front contact to the winding of the RD–2 slow releasing relay 806 and this relay immediately grounds the sleeve wire 807 to prevent the seizure of this trunk at the tandem office.

The RD–2 relay 806 extends ground from its armature 4 and front contact, through armature 5 and back contact of the RD–12 relay 700 and thence through the upper winding of the RD–21 relay 705 whereby this relay becomes operated. The RD–21 relay 705 locks through its front contact and armature 8 to the sleeve wire 802 so that the release of this relay and the trunk line will depend on the removal of ground at the distant connector or the connections controlled by the toll operator. Since, when a connection is extended from the tandem office over the trunk line of my above noted copending application to the toll board, the operator thereat has control of the release of such trunk and the release by the calling party is ineffective in releasing the train of switches employed for setting up this connection, the RD–21 relay will thus remain locked under the toll operator's control.

The RD–21 relay in operating performs a number of functions as follows. Through its armature 1 and front contact the RD–21 relay places an additional ground on the sleeve wire 807 to mark this trunk as busy in the tandem office. Through its armatures 2, 4, 6 and 7, the RD–21 relay places a bridge on the tip and ring conductors 800 and 801 of the incoming switch which may be traced from the tip conductor 800, armature 6 and front contact of the RD–21 relay 705, upper right winding 706 of the repeating coil, armature 2 and front contact of the RD–21 relay 705, resistance 707, lower low resistance winding of the SR relay 708, armature 4 and back contact of the SH relay 808, front contact and armature 4 of the RD–21 relay 705, lower right winding 709 of the repeating coil, front contact and armature 6 of the RD–2 relay 806, front contact and armature 7 of the RD–21 relay 705 to the ring conductor 801. It will be noted that the SR relay 708 does not operate at this time since the current flow therein is opposed to the current flow in its upper winding from ground, armature 11 and front contact of the RD-21 relay and the resistance 710. Through its armature 3 and front contact the RD–21 prepares the dial train counting circuit which will be more fully described hereinafter. Through its armature 9, the RD–21 relay extends a connection from the back contact of armature 1 of the CB–2 relay 805, the front contact and armature 9 of the RD–21 relay 705, armature 3 and back contact of the SR–1 relay 810, armature 2 and back contact of the SR–2 relay 702, the winding of the SH slow releasing relay 808 to battery so that this latter relay will respond to the train of dial pulses as the CB–2 relay 805 responds separately to each pulse of a said train. Another circuit is established from ground, through armature 3 and back contact of the SR relay 708, front contact and armature 10 of the RD–21 relay 705, armature 4 and back contact of the HS relay 809, to the MSR supervisory lamp 711 (to battery in the shelf supervisory circuit).

Assuming that the incoming selector switch has responded properly and in the manner hereinbefore described, the trunk is now ready to receive dial pulses.

*Pulse correction*

It will be noted that a pair of pulse correction relays, the PC–1 relay 515 and the PC–2 relay 512, are provided in the trunk termination circuit shown in Fig. 5. Such a pulse correction circuit is optional and may be provided or not as the local conditions warrant. By way of example, the pulse correction circuit has been shown at one end of this trunk but not at the other, though it may be provided at both ends. As shown, this circuit responds on outgoing calls (as presently being described) to the operation of the CB–1 relay 505 and on incoming calls to the operation of the CB–21 relay 612.

On the first impulse of the dial, the loop to the CB–1 relay 505 is opened and the relay restores, closing a circuit from its armature 1 and back contact through the front contact and armature 3 of the RD–1 relay 605, the back contact and armature 2 of the PC–2 relay 512 and the upper winding of the PC–1 relay 515. The PC–1 relay operates at the same time. The ground placed on armature 2 of the PC–2 relay is also extended through armature 1 and back contact thereof through armature 1 and front contact of the PC–1 relay 515, the upper winding of the PC–2 relay 512 to ground at the front contact and armature 1 of the RD–1 relay 605, thus short circuiting the upper winding of the PC–2 relay 512. The PC–1 relay through its armature 2 and front contact short circuits its lower winding to render it slow releasing. Through resistance 516 and the adjustable resistance 517 connected in circuit with the upper winding of the PC–1 relay 515, the slow releasing characteristic of this relay may be adjusted for the purpose of timing the pulses.

At the end of the first dial pulse the CB–1 relay 505 reoperates and removes ground from the back contact of armature 2 of the PC–2 relay 512 so that this relay will now tend to operate from the circuit having two branches in parallel, one through the upper winding of the PC–1 relay 515 and the other through the resistances 517 and 516 to battery. As the PC–2 relay 512 operates it establishes a circuit from battery through its lower winding, the front contacts of its armature 1, the armature 1 and front contact of the PC–1 relay 515, the upper winding of the PC–2 relay 512 to ground and this removes the last ground connection for holding the PC–1 relay 515. This relay therefore, in a time interval measured by its slow releasing characteristics, releases. In the meantime, upon the operation of the PC–2 relay 512 a circuit is established from ground, armature 1 and back contact of the SR relay 511, armature 3 and front contact of the PC–2 relay 512, the winding of the SH slow releasing relay 518 to battery so that this slow releasing relay will hold during the operations of the pulse correction circuit. Through its armature 2 and front contact the SH relay 518 short circuits the upper winding of the SR relay 511 to lower the resistance of the bridge repeating the pulses out over the trunk for the purpose of improving the transmission thereof.

The PC–2 relay 512 opens the bridge circuit to the trunk thus repeating the pulse into the trunk and transmitting it to the distant end. The operation of armatures 5 and 6 of the PC–2 relay 512 is of no consequence on an outgoing call, but is of importance on an incoming call when the pulse correction circuit responds to incoming pulses. Upon the release of the PC–1 relay 515 the circuit for the PC–2 relay 512 is opened and this relay thereupon restores, the interval over which it remains operated and over which it opens the bridge to the distant end of the trunk being measured by the slow releasing characteristics of the PC–1 relay 515.

The interaction of these two pulse correction relays will be repeated for each pulse of the train and after the last pulse thereof the PC–2 relay 512 will remain released whereupon the SH slow releasing relay 518 will release and allow the upper winding of the SR relay 511 to be inserted in the circuit to the distant end so that it may respond when the current transmitted therefrom is reversed, as will more fully appear hereinafter.

*Digit discrimination*

A pair of relays, the DD–1 relay 519 and the DD–2 relay 520, is employed to count the trains of dial pulses transmitted through this circuit. In short, the DD–2 relay will respond to one train of dial pulses but will be released if other trains of dial impulses follow. Thus, upon the operation of the SH relay 518 a circuit is established from ground, the armature 1 and front contact of RD–11 relay 607, the alternate contacts of armature 4 of the SH relay 518, armature 3 and back contact of the DD–1 relay 519 through the winding of the DD–2 relay 520 to battery. This relay operates and prepares a locking circuit for itself through the lower winding of the DD–1 relay 519. At the end of this train of pulses when the armature 4 of the SH relay 518 restores to normal, the ground at its back contact will be extended through the lower winding of the DD–1 relay 519, the armature 2 and front contact of the DD–2 relay 520, the winding of this relay to battery. The DD–2 relay remains operated in this circuit and the DD–1 relay 519 becomes operated, opening the original operating circuit of the DD–2 relay 520 and locking itself through its upper winding, its front contact and armature 1 to the ground at the front contact and armature 1 of the RD–11 relay 607. If but a single train of dial pulses is transmitted through this circuit as is being assumed in this connection to be established to the toll operator, the DD–2 relay will remain operated.

If, as will apear hereinafter, a connection is being established by means of this trunk to a local subscriber either in the tandem office or the toll office then other trains of pulses will follow. Upon the first of these trains and upon the operation of the SH relay 518, the lower winding of the DD–1 relay 519 will be opened thus releasing the DD–2 relay. The DD–1 relay 519, however, will remain operated hereinafter regardless of the operation of armature 4 of the SH relay 518. Therefore the DD–2 relay responds to the first train of dial pulses but releases if any further trains are transmitted and remains released thereafter.

*CLR operation*

The functions of the digit discrimination relays in Fig. 5 are to prepare the trunk circuit for CLR operation. By means of armature 3 and back contact of DD–2 relay 520 the circuit for the SR–11 relay 506 is opened so that hereinafter when the toll operator answers and thereby reverses the polarity of the current in the trunk line so that the SR relay 511 is operated, the ground which is extended by its armature 4 and front contact to the SR–1 relay 513 will not also be extended to the SR–11 relay 506. Therefore, the reversal of the line by the answer of the toll operator is not repeated by the SR–11 relay 506 toward the calling subscriber.

By its armature 4 and front contact the DD–2 relay 520 prepares a circuit to the peg count conductor 521 so that when the connection is released and the RD–11 relay 607 restores, the peg count conductor 521 will be grounded momentarily in order to make a count of the number of times this trunk is used on outgoing calls to toll. It may be noted that if the peg count conductor is placed on a back contact of armature 4 of the DD–2 relay 520, a peg count will be made of the number of times this trunk is used on outgoing free service calls. Again the peg count conductor 521 may be connected to both a front and a back contact of armature 4 of the DD–2 relay 520 so that a peg count will be made of all outgoing calls on this trunk.

Through its armature 1 and front contact the DD–2 relay 520 closes a circuit from ground, armature 1 and front contact of the RD–11 relay 607, armature 1 and back contact of the SR–1 relay 513, armature 1 and front contact of the DD–2 relay 520, thence through the winding of the CT relay 510 and in parallel therewith through the resistance 522 to charge the condenser 523. The operation of the CT relay will prepare a connection from the ring conductor through the front contact and armature 2 of the CT relay 510, a condenser 524, the secondary winding 525 of the tone coil to the normally open alternate contacts of armature 1 of the SR–1 relay 513. Through the operation of the DD–1 relay 519 the sleeve wire 509 is connected through armature 2 and front contact of DD–1 relay 519 and the primary winding 526 of the tone coil to ground so that during the operation of the CT relay 510 and the removal of ground from the back contact of armature 3 thereof the preceding switches used in building up this connection will be held through the primary of the tone coil.

When the toll operator answers and causes the operation of the SR relay 511, ground on its armature 4 will cause the operation of the SR–1 relay 513. This relay by its armature 1 opens the circuit of the CT relay 510 and at the same time completes the effective bridging of the talking circuit by the secondary of the tone coil 525 at the make contacts associated with armature 2. The CT relay 510, however, does not immediately release since the condenser 523 as soon as ground is removed from the winding of the CT relay will discharge through the winding of this relay and hold it operated for a short period of time. During this time the coil 525 will be effectively bridged across the talking conductors and hence any tone transmitted over the sleeve of the connection and thence through the primary winding 526 will be repeated in the talking conductors. It is conventional to place a tone on the sleeve of all coin box substations in the line circuit thereof and hence if a call is being established to the toll operator from a coin box a spurt of tone will be transmitted both to the calling subscriber and to the toll operator as soon as the toll operator answers on this call so that she will know how to charge for the desired connection.

It will be noted that if more than one digit is transmitted through this trunk in building up a distant connection that upon the transmission of the second digit the DD–2 relay 520 will be released and this will release the CT relay 510 which has been operated by the transmission of the first digit. However, upon the operation of the CT relay in this instance the tone coil 525 is not bridged across the line since the SR–1 relay is not operated at this time. Hence no tone will be transmitted into the talking circuit when a local connection is being established.

*Digit discrimination at distant end*

At the distant end of the trunk, that is the termination in the tandem office shown in Figs. 7 and 8, there is another pair of digit discrimination relays, the DD–1 relay 811 and the DD–2 relay 712. These relays operate in a similar manner, that is when the SH relay 808 responds to the transmission of the first digit through this trunk from the back contact of armature 1 of the CB–2 relay 805, a connection will be extended from ground, the armature 3 and front contact of the RD–21 relay 705, the alternate contacts of armature 2 of the SH relay 808, the armature 2 and back contact of the DD–1 relay 811, the winding of the DD–2 relay 712 to battery. The DD–2 relay now establishes a circuit through its winding, its front contact and armature 1, the lower winding of the DD–1 relay 811 to armature 2 of the SH relay 808 so that at the end of this train of pulses the DD–2 relay will be held operated and the DD–1 relay 811 will be operated through its lower winding. The DD–1 relay now locks itself through its upper winding, its front contact and armature 1 to the conductor 807 so that this relay will remain operated hereinafter. If, as before, another train of dial pulses is transmitted through this trunk then upon the next operation of the SH relay 808 the connection through the lower winding of the DD–1 relay will be opened and the DD–2 relay 712 will release. Since the DD–1 relay 811, however, remains operated no operating circuit for the DD–2 relay 712 will be established.

The DD–2 relay 712 functions to close the HS conductor 803 leading to the incoming selector through armature 2 and front contact of the DD–2 relay to the upper winding of the HS relay 809 so that HS supervision from the toll operator's position may be exercised in this trunk.

When the call has been extended from a local substation in the sub office to the operator's position in the toll office, the HS conductor 803 will be connected to battery in a conventional manner and this battery connection being extended through armature 2 and front contact of the DD–2 relay 712 will cause the operation of the HS relay 809. Thereupon a connection will be established from ground, armature 5 and front contact of the RD–2 relay 806, armature 2 and front contact of the HS relay 809, armature 9 and back contact of the RD–12 relay 700 to the winding of the SR–2 relay 702 whereby the current flowing in the trunk is reversed to operate the SR relay 511, as hereinbefore described. It may be noted that armature 1 of the HS relay 809 plays no part in the operations on a call extended from the sub office to the tandem office. The functions of this armature will be described hereinafter in connection with a call from the toll operator to a subscriber in the sub office.

Thus it will be seen that digit discriminating means independent of each other but both responding to the same train of dial pulses are provided in both the terminals of this trunk line and that on an outgoing call from the sub office they convert the trunk for CLR operation.

*CLR operation*

The trunk may be used by the calling subscriber to establish a connection to the toll operator through the incoming switch connected to the tip, ring, sleeve and HS conductors 800 to 803, inclusive, respectively, thence over the simplexed trunk line disclosed in my above noted copending application. The calling subscriber after giving the necessary information to the toll operator whereby she may record the details of the wanted long distance connection may hang up but does not by this act release the connection which has been established, that function being wholly within the power of the toll operator. When the toll operator has established the wanted connection she may recall the calling subscriber in conventional manner. If the calling subscriber does not hang up then the wanted toll or long distance connection may be completed over this trunk.

When the use of the trunk has terminated the toll operator may release the connection by changing the battery connection to the HS conductor 803 to a ground connection so that the HS relay 809 is released. When the calling subscriber has also hung up and the CB–2 relay 805 is released, ground is removed from the winding of the RD–2 relay 806, thus allowing this slow release relay to release. By the same token, the SR–2 relay 702 is released and the polarity of the line in the trunk is returned to normal whereby the SR relay 511 is released. Since the calling subscriber also releases at this time, the CB–1 relay 505 is released and thus the RD–1 relay 605 and in turn the RD–11 relay 607 are both released and the circuits return to normal. Since ground is now removed from the sleeve conductor 509 the preceding switches will release in conventional manner.

*Free service call*

When the calling subscriber at the sub office seizes this trunk in the manner described and dials a plurality of trains of dial pulses thereover, the digit discriminating relays on both ends of this trunk operate to the condition where the DD–2 relay is released but the DD–1 relay remains operated. At the sub office termination of this trunk the CT relay will be in released condition and the SR–11 relay will be effectively placed in parallel with the SR–1 relay 513. Therefore, when under conventional circumstances, the called subscriber reached over the incoming switch associated with this trunk over conductors 800 to 803, inclusive, answers, the reversal of the current from the connector will be reflected in the operation of the SR relay 703 and in turn by the operation of the SR relay 511. Thus, through the movement of armature 4 of the SR relay 511 both the SR–11 relay 506 and the SR–1 relay 513 will be operated and the first of these relays will cause a reversal of the line current to the calling subscriber for conventional purposes, such as the collection of a coin if the call has been established from a coin box. The trunk will be under control of the calling subscriber so that when such calling subscriber hangs up the CB–1 relay 505 will release and cause the release of the RD–1 relay 605. Since this also causes the release of the RD–11 relay 607 and the DD–1 relay 519, the ground at armature 3 and back contact of the CT relay 510 will be removed from the sleeve conductor 509 and thus the switches preceding this trunk will be released. Through the release of the RD–11 relay 607 the bridge will be removed from the trunk and the CB–2 relay 805 at the tandem office will be released, thus causing the release of the slow releasing relays in the termination of the trunk at the tandem office. Since the bridge across the tip and ring terminals of the incoming switch is thus removed, the connector reached over this incoming circuit will be affected in the conventional manner and the incoming switch will be immediately released even though the connector may be held under control of the called subscriber for a further period.

*Outgoing connections over the trunk from the tandem office*

The outgoing connections over this trunk from the tandem office may be established either by a local subscriber in the tandem office, a local subscriber in the toll office, or from the toll board. If the connection comes from a local subscriber in the tandem office, then a selector switch therein will seize the FS (free service) terminals 813, 814 and 815. It will be noted at this time that there is no connection to the HS lead and therefore there will be no means of operating the HS relay 809. If the connection comes from the incoming switch controlled over the trunk from the toll office, then the toll terminals 816 to 819 inclusive, will be seized and in this case a connection to the HS relay 809 will be made. If the connection has come from a local subscriber in the toll office, then the HS relay 809 will not be operated but if the connection comes from the toll board, then the HS relay 809 may be operated to mark the connection as toll.

It is believed that it will be readily apparent that whereas on an incoming call to this circuit of Figs. 7 and 8 the CB–2 relay 805 and its associated RD–2 relay 806 and RD–21 relay 705 will be operated, that in the case of an outgoing call the CB–1 relay 812 and its associated slow releasing relays will be operated instead. Thus the bridge put on the tip and ring conductors over either terminals 813 and 814 or terminals 816 and 817 will cause the operation of the CB–1 relay 812. This relay through its armature 1 and front contact will cause the operation of the RD–1 relay 713 which in turn will cause the operation of the RD–11 relay 703 and which again in turn will cause the operation of the RD–12 relay 700. If this trunk is marked for toll then the RD–2 relay 806 additionally will be operated through armature 3 and front contact of the HS relay 809, whereupon the RD–2 relay will lock through its own armature 4 and front contact and the armature 5 and front contact of the RD–12 relay 700.

This marking of the trunk between the tandem office and the sub office takes place after the trunk has been seized over the incoming switch from the toll office and when the toll operator thereat transmits dial pulses to set the incoming switch leading from the trunk in Fig. 5 and other switches such as the connector beyond in order to reach a called subscriber. In this case and during the dialing operation by the toll operator the HS conductor will be changed from ground to battery to operate the HS relay 809 in accordance with the disclosure in my said copending application. The RD–2 relay 806 will be operated at that time.

In general, it is to be noted that when the trunk line is seized over either its toll or FS terminals the CB–1 relay 812, the RD–1 relay 713, the RD–11 relay 703 and the RD–12 relay 700 will be operated and a bridge including the lower low resistance winding of the SR relay 708 will be established across the trunk conductors 603 and 604.

In general, also, the CB–21 relay 612 and the CB–22 relay 613 will respond and bring up the RD–2 slow releasing relay 614 and the RD–21 relay 600. This latter relay grounds the sleeve wire 509 to mark the trunk as unavailable and a bridge is established across the T conductor 527 and the R conductor 528 leading to the associated incoming selector. As described later, when the trunk is used in a connection from the toll board that during dialing and particularly during the dialing to set the connector the HS conductor 529 will be changed from ground to battery to operate the TL relay in the connector to lock out the ringing circuit so that ringing will be under control of the toll operator.

Again, it should be noted in general, that when connections are being established over this trunk in the direction from the tandem office to the sub office neither set of digit discrimination relays is operated since no discrimination between the number of trains of dial pulses need be made for traffic in this direction.

*Detailed description*

When this trunk line is seized in the tandem office over either its toll or FS terminals, a bridge is established from the tip to the ring conductor, which may then be traced from ground, the upper winding of the CB–1 relay 812, the back contact and armature 2 of the RD–21 relay 705, the upper right winding 706 of the repeating coil, armature 1 and back contact of the SR–1 relay 810, the tip conductor, the said bridge, the ring conductor, back contact and armature 2 of the SR–1 relay 810, lower right winding 709 of the repeating coil, armature 4 and back contact of the RD–21 relay 705 and the lower winding of the CB–1 relay 812 to battery. The CB–1 relay closes a circuit from ground, its armature 1 and front contact to the winding of the RD–1 slow releasing relay 713 to battery and this relay in responding, operates the RD–11 slow releasing relay 703, in turn causing the operation of the RD–12 relay 700. The sleeve conductor 807 is grounded by armature 6 and front contact of the RD–12 relay 700 and a bridge circuit is established from tip conductor 603, back contact and armature 1 of the SR–2 relay 702, upper left winding 701 of the repeating coil, armature 3 and front contact of the RD–12 relay 700, armature 2 and front contact of the RD–1 relay 713, lower low resistance winding of the SR relay 708, armature 4 and back contact of the SH relay 808, front contact and armature 7 of the RD–12 relay 700, lower left winding 704 of the repeating coil, front contact and armature 2 of the CB–1 relay 812 (the dialing contact) front contact and armature 5 of the RD–1 relay 713, armature 4 and back contact of the SR–2 relay 702 to the ring conductor 604. Since the upper winding of the SR relay 708 is now energized from ground over armature 4 and front contact of the RD–1 relay 713 and the resistance 710, this SR relay will not operate until the polarity of the current in its lower winding is reversed.

Regarding the slow releasing relays, it should be noted at this time that the RD–1 relay 713, by its armature 1 prepares a battery connection for back HS supervision, at its armatures 2 and 5 establishes the bridge circuit just described, at its armature 3 operates the RD–11 relay 703, at its armature 4 biases the SR relay 708 and at its armature 6 prepares a locking circuit for the SH relay 808. The RD–12 relay 700 performs numerous functions. By its armature 1 it grounds the comparatively low resistance 714 whereby the HS relay is enabled to pass on a signal to the distant trunk termination to operate the TA relay 615 thereat to mark the trunk as having been seized in a toll connection. This is of no significance in a local or free service call as the HS relay 809 will not be operated in such a call. By its armature 2, the RD–12 relay prepares a circuit for the SH–1 relay 820. Through its armatures 3 and 7 the bridge circuit described is established, and through its armature 4 it prepares a circuit from the back contact of the CB–1 relay 812 to operate the SH relay 808 during dialing. Armature 5 functions to close a locking circuit for the RD–2 relay 806 if and when this latter relay is operated. Armature 6 grounds the sleeve wire 807, armature 8 prepares the peg count circuit, armature 9 prepares a circuit whereby the SR–1 relay 810 may respond to the operation of the SR relay 708 and armature 10 closes a circuit for the monitor lamp 711. The RD–11 relay imparts its slow releasing characteristics to the heavy duty RD–12 relay 700.

At the sub office termination of this trunk a circuit may be traced from ground, the winding of CB–22 relay 613, back contact and armature 1 of the SH relay 518, back contact and armature 2 of the RD–11 relay 607, upper right winding 609 of the repeating coil, armature 1 and back contact of the SR–2 relay 608, tip conductor 603 over the bridge circuit described, ring conductor 604, back contact and armature 2 of the SR–2 relay 608, back contact and armature 4 of the RD–1 relay 605, and alternatively through armature 4 and back contact of the PC–2 relay 512, armature 3 and back contact of the SR–1 relay 513, the lower right winding 611 of the repeating coil, adjustable resistance 610, armature 3 and back contact of the RD–11 relay 607, and the winding of the CB–21 relay 612 to battery. Both the CB–21 and the CB–22 relays respond in this circuit. The CB–22 relay prepares a circuit for transmitting an HS signal over the HS conductor 529 of the incoming switch and the CB–21 relay prepares circuits for the transmission of dial pulses to the incoming switch. The CB–21 relay immediately operates the RD–2 slow releasing relay 614 and this in turn operates the RD–21 relay 600. The RD–2 relay imparts its slow releasing characteristics to the RD–21 relay 600. This latter, heavy duty relay performs a number of functions as follows. By its armatures 1, 2 and 7 it establishes a bridge circuit from the ring conductor 528, the back contact and armature 5 of the PC–2 relay 512, armature 3 and front contact of the RD–2 relay 614, lower left winding 602 of the repeating coil, armature 1 and front contact of the RD–21 relay 600, resistance 615, upper low resistance winding of the SR relay 511, front contact and armature 2 of the RD–21 relay 600, upper left winding 601 of the repeating coil, front contact and armature 7 of the RD–21 relay 600 to the tip conductor 527. Armature 3 of the RD–21 relay grounds the resistance 514 to provide a bias circuit for the SR relay 511 so that this relay will not operate in the above described bridge circuit until the called party answers and the line current is reversed as a result thereof. Armature 4 prepares a locking circuit for the TA relay 614, armature 5 grounds the sleeve conductor 509 and armature 6 closes the HS circuit to armature 4 of the SR–1 relay 513, armature 8 acting to further prepare the HS circuit. Armature 9 of the RD–21 relay closes a circuit from the monitor lamp 529 to the ground on the armature 4 of the SR relay 511. This trunk is now ready to receive dial pulses.

*Dialing*

When the calling subscriber transmits a train of dial pulses, the CB–1 relay 812 will follow these pulses. Upon the first release of the CB–1 relay 812, a circuit will be established from ground, armature 1 and back contact thereof, front contact and armature 4 of the RD–12 relay 700, armature 3 and back contact of the SR–1 relay 810, armature 2 and back contact of the SR–2 relay 702, winding of the SH relay 808 to battery. This relay responds and locks in a circuit from ground, armature 11 and back contact of the RD–21 relay 705, armature 6 and front contact of the RD–1 relay 713, back contact and armature 1 of the SH–1 relay 820, armature 3 and front contact of the SH relay 808 and thence through the winding thereof to battery. It will be noted that the SH–1 relay acts to hold the SH relay during dialing but will operate at the end of this train of pulses to release the SH relay 808.

The dialing is transmitted by the contacts of armature 2 of the CB–1 relay 812 which opens the bridge circuit to the line conductors 603 and 604 and thus causes the operation of the calling bridge relays in the distant trunk termination. It has been noted that the CB–22 relay 613 is connected to the tip conductor 602 and that the CB–21 relay 612 is connected to the ring conductor 604. Both of these relays will respond to the dial pulses and the CB–21 relay 612 through its armature 2 and back contact and the front contact and armature 2 of the RD–2 relay 614 will ground the back contact and armature 2 of the PC–2 relay 512. These pulse correction relays will operate as hereinbefore described and by periodically opening the circuit at armature 5 and back contact of the PC–2 relay 512, will repeat the impulses into the circuit of the incoming selector switch. Thereafter the operations are conventional in that the selector will be driven to a desired level, a connector will be selected and then will be set in accordance with further transmitted trains of dial pulses. When the called subscriber answers, the line will be reversed and consequently the SR relay 511 will be operated. As a result of this a circuit will be established from ground which is found on the HS conductor in the connector circuit (back contact and armature 4 of the AB relay 308) over the HS conductor 529, armature 3 and front contact of the SR relay 511, armature 8 and front contact of the RD–21 relay 600, back contact and armature 2 of the TA relay 614, front contact and armature 6 of the RD–21 relay 600, armature 4 and back contact of the SR–1 relay 513, front contact and armature 2 of the SR relay 511 to the winding of the SR-2 relay 608. This relay therefore reverses the polarity of the current in the trunk line and in turn causes the operation of the SR relay 708 therein. The SR relay 708 closes a circuit from ground, its armature 3 and front contact, the armature 9 and front contact of the RD–12 relay 700, armature 3 and back contact of the RD–2 relay 806, through the winding of the SR–1 relay 810 to battery. In this manner the battery to the calling subscriber is reversed, for conventional purposes. If the called subscriber should hang up first, then these operations just described will be reversed. When the calling subscriber hangs up, the CB–1 relay will release and the slow releasing relays depending on its armature 1 and front contact will release in accordance with their slow releasing characteristics. At the same time the bridge to the distant end will be opened by the armature 2 of the CB–1 relay 812 and the distant end will release thereupon. Both the CB–22 relay 613 and the CB–21 relay 612 will release. The release of the CB–21 relay will relieve the slow releasing relays and the bridge to the incoming switch will be opened. The calling bridge relay in the connector will therefore be opened and the connector, and thereafter the incoming selector, will be released in conventional manner.

*Connection extended from toll board*

When the trunk line of Figs. 5 to 8, inclusive, is seized in the tandem office over the terminals 816 to 819, inclusive, by a selector set over the trunk line between the tandem office and the toll board in accordance with my said copending application, the operations will be the same as hereinbefore described until the first set of dial pulses is transmitted by the toll operator. At this time and during the transmission of this set of pulses the ground ordinarily connected to the HS terminal 819 will be changed to a battery connection whereupon the HS relay 809 will respond. Thereupon a circuit will be extended from ground, armature 3 and front contact of the HS relay, the winding of the RD–2 relay 806 to battery and this relay in responding will lock itself in a circuit from ground, its armature 4 and front contact, the armature 5 and front contact of the RD–12 relay 700 and thence through its winding to battery. The RD–2 relay 806 performs a number of functions during the existence of this connection, as follows. Through its armature 1 it places battery through armature 1 and front contact of the RD–1 relay 713 on the front contact of armature 1 of the SR relay 708 so that the SR relay in operating may provide HS signaling back toward the toll board. Armature 1 of the SR relay normally is provided with ground on its back contact and now having battery on its front contact its movement will change the HS conductor from a normal ground connection to a battery connection. Armature 2 of the RD–2 relay 806 places ground on the sleeve conductor 807 to fortify the connection made by the armature 6 of the RD–12 relay 700. Armature 3 of the RD–2 relay 806 opens the circuit of the SR–1 relay 810 so that reverse battery supervision will not be given over the trunk to the toll board. Armature 4 of the RD–2 relay closes the locking circuit above described and armature 5 grounds the armature 2 of the HS relay 809 so that this relay in responding to HS supervision from the toll operator will be able to operate the SR–2 relay 702 to reverse the current in the line toward the sub office. Armature 6 of the RD–2 relay 806 closes a circuit through the front contact and armature 5 of the SH relay 808 (during dialing), one terminal of the lower right winding 709 of the repeating coil, the lower terminal thereof to the front contact of armature 6 of the RD–2 relay 806, whereby this lower right winding 709 is short circuited.

During the dialing period on a connetcion from the toll board the normal ground on the HS conductor is changed to battery so that the HS relay 809 is operated. This completes a low resistance path from ground, armature 1 and front contact of the RD–12 relay 700, low resistance 714, front contact and armature 1 of the HS relay 809 to the tip side of the bridge established over the conductors 603 and 604 thence, during the operation of the SH relay 518 through armature 1 and front contact thereof, armature 1 and front contact of the CB–21 relay 612 (during the operated periods thereof) to the lower winding of the TA relay 615 to battery. The TA relay will operate in this low resistance circuit and will lock through its front contact and armature 1 to the ground on armature 4 of the RD–21 relay 600. The TA relay 615 controls connections to the HS conductor 529 so that HS supervision can be extended in to the incoming selector and the connector circuit. Thus during dialing from the toll board, after this trunk has been marked for toll service by the operation of the TA relay 615, the normal ground on armature 4 of the SR–1 relay 513 is changed to battery through resistance 530 whereby the TL relay 412 in the connector is operated. The circuits for this may be traced, first from the ground for operating the RD–1 relay 605, through armature 6 and front contact thereof, armature 5 and back contact of the SR–1 relay 513 (before the operation thereof), or from ground, the alternate contacts of armature 5 of the SR–1 relay 513 (after the operation thereof), front contact and armature 5 of the SH relay 518 (operated during dialing) front contact and armature 3 of the TA relay 615, the winding of the SR–1 relay 513. Thus on a toll call the SR–1 relay responds during dialing so that its armature 4 may change the normal ground on the outgoing HS conductor to battery. Thus ringing by the connector may be withheld.

When the toll operator wishes to ring the called party she operates her ringing key and this in turn will cause the normal ground on the HS conductor to be changed to battery whereby the HS relay 809 is operated. The operator's ringing key in conventional manner also produces a single short interruption of the line current so that the pulse correction relays are operated through one cycle. Thus the SH relay 518 and then the SR–1 relay 513 operate and the latter places battery through the resistance 530 on the HS conductor 529 to cause the operation of the TL relay 412 in the connector. The momentary operation of this toll relay unlocks the RT relay 409 so that upon the restoration of the TL relay ringing current through the winding of the ringing trip relay will be applied to the called line. It may be noted at this point that after the called subscriber has answered and the SW cut through relay 410 has been operated and locked, that the toll operator may rering the called subscriber by a continuous source of ringing current independent of the ringing trip relay. She may prolong the application of this ringing current by repeatedly operating her ringing key so that a train of pulses will be transmitted simulating a train of dial pulses which will maintain the SR–1 relay operated for any desired length of time.

*The called party answers*

When the called party answers, the SR relay 511 responds and the AB relay 308 in the connector by its armature 4 changes the normal ground conncetion to the HS conductor to battery so that battery is now extended over the HS conductor 529, front contact and armature 2 of the TA relay 615, front contact and armature 6 of the RD–21 relay 600, armature 4 and back contact of the SR–1 relay 513, front contact and armature 2 of the SR relay 511 to the winding of the SR–2 relay 608 and thence to ground. The SR–2 relay 608 operates and reverses the trunk so that the SR relay 708 is caused to respond. This in turn transmits the called party answer signal to the distant toll operator. The RD–2 relay 806 being operated at this time, the SR–1 relay 810 cannot be operated to reverse the line, but the SR relay 708 changes the connection to the HS relay 809 from ground at the back contact of armature 1 to battery on the front contact of armature 1 of the RD–2 relay 806. Thus the signal that the called party has answered is given from the connector to the two way trunk line both by reversal of the line through the selector and by the HS change from ground to battery. The signal over the trunk line between the sub office and the tandem office is in the form of a reversal of the line and from the trunk line termination in the tandem office to the toll board in the distant toll office is in the form of the conventional HS supervision change from ground to battery.

*Release*

When the conversation is finished and the called party hangs up, the operation just described is reversed by the release of the AB relay 308. When the toll operator releases the connection, the bridge across the incoming tip and ring is released and the CB–1 relay 812 is allowed to release. This opens the bridge to the distant end of the trunk at the sub office and after a short interval releases the slow releasing RD–1 relay 713, RD–11 relay 703 and the RD–12 relay 700. The removal of the bridge across the trunk conductors releases the CB–21 relay 612 and the CB–22 relay 613 whereupon the dependent slow releasing RD–2 relay 614, and the RD–21 relay 600 are released and the bridge across the tip and ring conductors to the incoming switch is opened. Thus the CB relay 304 in the connector is released and the connector is restored to normal. This removes ground from the sleeve wire of the selector, releasing the SW relay 210 therein and releasing the selector. Thus the connection from the toll board to the called substation in the distant sub office is released.

What is claimed is:

1. In a telecommunication system, a trunk line having a termination circuit at each end thereof, digit discrimination means in each said termination circuit for altering the circuit arrangement thereof, said digit discrimination means in said termination circuits being independent of each other but concurrently responsive to trains of digital impulses transmitted over said trunk line, said digit discrimination means responding in one manner to a single train of digital impulses and responding in another manner to any additional number of trains of digital impulses.

2. In a telecommunication system, a trunk line having a termination circuit at each end thereof, digit discrimination means in each said termination circuit for adapting said trunk for completing line recording operations or alternatively for conventional dialing operations, said digit discrimination means in said termination circuits being independent of each other but conjointly responsive to trains of digital impulses transmitted over said trunk line, said digit discrimination means responding in different manners to different numbers of trains of digital impulses.

3. In a telecommunication system, a trunk line having a termination circuit at each end thereof, digit discrimination means in said termination circuits for altering the circuit arrangement thereof, said digit discrimination means being differently responsive to different numbers of trains of digital impulses transmitted over said trunk, said digit discrimination means being responsive to trains of digital impulses transmitted over said trunk in one direction only.

4. In a telecommunication system, a two way trunk for serving toll and local connections in both directions, means in said trunk responsive to trains of dial pulses transmitted in one direction therethrough for adapting said trunk to one or the other of said services and means controlled by signals transmitted to said trunk during use of said trunk in the other direction for adapting said trunk to one or the other of said services.

5. In a telecommunication system, a two way trunk circuit for establishing connections in one direction either to local subscriber's stations or to a toll board and for establishing connections in the other direction either from local subscriber's stations or from a toll board, means responsive to the number of trains of dial pulses transmitted over said trunk in the said one direction for changing the circuit arrangement of said trunk in accordance with the destination of a call and means in said trunk responsive to signals transmitted thereto during the use of said trunk in the said other direction for changing the circuit arrangement of said trunk in accordance with the origin of a call.

6. In a telecommunication system, a two way trunk circuit, a termination circuit at each end thereof, an outgoing calling bridge relay and an incoming calling bridge relay for each said termination circuit, a pair of digit discrimination relays in each said termination circuit, said digit discrimination relays being responsive to trains of dial pulses transmitted through said trunk in one direction only, said digit discrimination relays in one termination circuit being under control of their associated outgoing calling bridge relay and in the other termination circuit being under control of their associated incoming calling bridge relay, slow releasing holding relays responsive to said calling bridge relays, a tone circuit controlled by the said digit discrimination relays at the outgoing end of said trunk when used in said one direction, means under control of said incoming calling bridge relay at said outgoing end termination circuit and its said dependent slow releasing relays for holding said trunk against release, and means under control of said digit discrimination relays at said outgoing end for connecting said tone circuit to provide coin station identification.

7. In a telecommunication system, a two way trunk circuit having a talking channel and a termination circuit at each end thereof, outgoing terminals for each said termination circuit over which said trunk may be seized, an incoming selector switch connected to each said termination circuit for extending connections from said trunk, loop dialing means in each said termination circuit operated over said outgoing terminals for repeating dial pulses to the other of said termination circuits, loop dialing means in each said termination circuits responsive to dial pulses repeated thereinto by said first loop dialing means for operating said incoming selector switch, digit discrimination means in said termination circuits responsive only to trains of dial pulses transmitted over said outgoing terminals of the first of said termination circuits, said digit discrimination means being responsive in said first of said termination circuits to the said loop dialing means therein operated over said outgoing terminals and in said other termination circuit to said other loop dialing means responsive to dial pulses repeated thereinto for operating said incoming selector switch, means in said termination circuits controlled by said loop dialing means for holding said trunk against release, means in said first termination circuit responsive to the operation of said digit discrimination means by a single train of dial pulses for establishing an additional holding circuit therefor under control of the circuit extended by said trunk over said incoming switch associated by the other of said termination circuits, and means in the other of said termination circuits responsive to the said digit discrimination means therein when operated by said loop dialing means therein in response to the repeating thereinto of a single train of dial pulses for establishing a control circuit from said incoming switch for controlling said additional holding circuit in the said first of said termination circuits.

8. In a telecommunication system, a two way trunk circuit having a talking channel and a termination circuit at each end thereof, outgoing terminal for each said termination circuit over which said trunk may be seized, an incoming selector switch connected to each said termination circuit for extending connections from said trunk, loop dialing means in each said termination circuit operated over said outgoing terminals for repeating dial pulses to the other of said termination circuits, loop dialing means in each said termination circuits responsive to dial pulses repeated thereinto by said first loop dialing means for operating said incoming selector switch, digit discrimination means in said termination circuits responsive only to trains of dial pulses transmitted over said outgoing terminals of the first of said termination circuits, said digit discrimination means being responsive in said first of sad termination circuits to the said loop dialing means therein operated over said outgoing terminals and in said other termination circuit to said other loop dialing means responsive to dial pulses repeated thereinto for operating said incoming selector switch, means in said termination circuits controlled by said loop dialing means for holding said trunk against release, means in said first termination circuit responsive to the operation of said digit discrimination means by a single train of dial pulses for establishing an additional holding circuit therefor under control of the circuit extended by said trunk over said incoming switch associated by the other of said termination circuits, and means in the other of said termination circuits responsive to the said digit discrimination means therein when operated by said loop dialing means therein in response to the repeating thereinto of a single train of dial pulses for establishing a control circuit from said incoming switch for controlling said additional holding circuit in the said first of said termination circuits, said additional holding circuit in said first termination circuit consisting of a transformer having a primary coil connected in parallel with said first holding circuit of said termination circuit and a secondary coil in a circuit accessible to said talking channel whereby a tone on the holding circuit of said trunk may be repeated into the said talking circuit thereof.

9. In a telecommunication system, a trunk line having a termination circuit at each end thereof, said trunk line and its said termination circuits being adapted to transmit trains of pulses therethrough, a counting means in each of said termination circuits for counting the number of trains of pulses transmitted therethrough, and means in each said termination circuit responsive to said counting means for altering the circuitry thereof.

10. In a telecommunication system, a trunk line having a termination circuit at each end thereof, said trunk line and its said termination circuits being adapted to transmit trains of pulses therethrough, a counting means in each of said termination circuits for counting the number of trains of pulses transmitted therethrough, said counting means in said termination circuits being independent of each other but concurrently responsive to said trains of pulses and means in each said termination circuit responsive to its associated counting means for altering the circuitry thereof.

References Cited in the file of this patent

UNITED STATES PATENTS

| | | |
|---|---|---|
| Re. 22,440 | King | Feb. 22, 1944 |
| 1,920,214 | Preuss | Aug. 1, 1933 |